US007975224B2

(12) United States Patent
Paterson et al.

(10) Patent No.: US 7,975,224 B2
(45) Date of Patent: Jul. 5, 2011

(54) WYSIWYG MULTIFUNCTION DEVICE FINISHING OPTIONS

(75) Inventors: Neil R. Paterson, Letchworth (GB); John V. Korhonen, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 950 days.

(21) Appl. No.: 11/314,667

(22) Filed: Dec. 21, 2005

(65) Prior Publication Data

US 2007/0143671 A1 Jun. 21, 2007

(51) Int. Cl.
*G06F 17/21* (2006.01)
(52) U.S. Cl. ........................................................ 715/274
(58) Field of Classification Search .................... 715/274
See application file for complete search history.

(56) References Cited

U.S. PATENT DOCUMENTS

| | | | | |
|---|---|---|---|---|
| 5,185,628 | A * | 2/1993 | Wilson et al. ................... | 399/81 |
| 6,091,929 | A | 7/2000 | Yamazaki et al. | |
| 6,115,510 | A | 9/2000 | Koga | |
| 6,134,019 | A | 10/2000 | Wantuck, Jr. et al. | |
| 6,453,132 | B2 * | 9/2002 | Ishikura ............................ | 399/81 |
| 6,473,539 | B1 | 10/2002 | Koga | |
| 6,615,346 | B1 * | 9/2003 | Kawamoto ..................... | 713/100 |
| 6,621,590 | B1 * | 9/2003 | Livingston ..................... | 358/1.15 |
| 6,927,865 | B1 * | 8/2005 | Kujirai et al. .................. | 358/1.12 |
| 6,965,440 | B1 * | 11/2005 | Nakagiri et al. ............... | 358/1.12 |
| 7,212,309 | B1 * | 5/2007 | Sellers et al. ..................... | 358/1.2 |
| 7,301,662 | B2 * | 11/2007 | Mifune .............................. | 715/769 |
| 7,502,136 | B2 * | 3/2009 | Murata ........................... | 358/1.16 |
| 2001/0044868 | A1 * | 11/2001 | Roztocil et al. ................. | 710/129 |
| 2002/0069228 | A1 * | 6/2002 | Mori et al. ....................... | 707/524 |
| 2002/0075498 | A1 * | 6/2002 | Ozaki .............................. | 358/1.13 |
| 2002/0118382 | A1 * | 8/2002 | Jackelen ......................... | 358/1.13 |
| 2002/0135800 | A1 * | 9/2002 | Dutta ............................... | 358/1.15 |
| 2003/0011802 | A1 * | 1/2003 | Nakagiri et al. ............... | 358/1.13 |
| 2003/0043211 | A1 * | 3/2003 | Kremer et al. .................. | 345/838 |
| 2003/0133162 | A1 * | 7/2003 | Lupien et al. .................. | 358/3.26 |
| 2003/0140315 | A1 * | 7/2003 | Blumberg et al. ............. | 715/527 |
| 2003/0142325 | A1 * | 7/2003 | Leslie .............................. | 358/1.1 |
| 2004/0008217 | A1 * | 1/2004 | Livingston ..................... | 345/700 |
| 2004/0194026 | A1 * | 9/2004 | Barrus et al. .................. | 715/515 |
| 2005/0008387 | A1 * | 1/2005 | Sato ................................ | 399/81 |
| 2005/0200879 | A1 * | 9/2005 | Nakagiri et al. ............... | 358/1.13 |
| 2005/0206916 | A1 * | 9/2005 | Nakagiri et al. ................. | 358/1.2 |
| 2006/0028659 | A1 * | 2/2006 | Nishikawa ....................... | 358/1.2 |
| 2006/0088331 | A1 * | 4/2006 | Inoue et al. ...................... | 399/81 |

FOREIGN PATENT DOCUMENTS

JP 2000094780 A * 4/2000

\* cited by examiner

*Primary Examiner* — Laurie Ries
*Assistant Examiner* — Frank D Mills
(74) *Attorney, Agent, or Firm* — Fay Sharpe LLP

(57) ABSTRACT

A method, document processing apparatus, and computer readable recording medium for performing document preparation of documents to be printed by a multi-function output device capable of applying finishing functions to the printed document. A document preparation program further includes a WYSIWYG display function for displaying the document or portions of the document in a WYSIWYG format. The document preparation program is configured to display a current document in a document window, display document finishing options to a user, accept user selections of one or more of the document finishing options, and display a representation of the user-selected document finishing options in the document window with displayed pages of the current document.

14 Claims, 6 Drawing Sheets

WYSIWYG MULTIFUNCTION DEVICE FINISHING OPTIONS

CROSS-REFERENCE TO RELATED APPLICATION

The present invention is related to U.S. Patent Application Publication No. 2007-0143696-A1, entitled UL DESIGN: WYSIWYG FINISHING, by McComber, the disclosure of which is incorporated herein by reference in its entirety.

BACKGROUND

Modern printing systems often include document finishing options such as, e.g., hole punching, stapling, binding, or various folding options such as V-folding, C-folding, and Z-folding. In many systems, these document finishing options are set at the printer station after the document has been created thereby leading to some confusion as to setting the correct finishing options and/or whether the finishing options will conflict with the printed document. For example, if a document was created with a narrow left margin and hole punches are selected as document finishing options on the left side of the document, it is possible that the hole punching will occur through printed text on the document. Unfortunately, this is not determined until after the document has started printing, thereby creating ousted materials and time.

Even if the document finishing options are determined by a user at a workstation where the document is being prepared, some confusion may exist as to exactly where the finishing options will be applied and whether or not there is a conflict between the selected finishing option and document text. The confusion exists because, currently, printer settings in, e.g., a printer properties menu, do not have any visualization for the finishing options that the printer/multi-function device can offer. This can also lead to ambiguous choices for positioning of staples, holes, and folds, etc. A simple example of an ambiguous finishing option choice would be where the user selects a stapling option for the top left corner and also the bottom right corner of a document. There is a need, therefore, for an improved method of selecting document finishing options in order to avoid the aforementioned confusion and possibility of ambiguous choices.

BRIEF DESCRIPTION

A method is provided in a multifunction printing/output device for configuring document finishing options. The method includes displaying a current document in a first document window included on the multifunction printing/output device, displaying in a second window a plurality of document finishing options, accepting user-selections of one or more of the document finishing options, displaying a representation of the user-selected document finishing options in the first document window overlaid on displayed pages of the current document, automatically detecting a conflicting overlap between one or more of the plurality of user-selected document finishing options and content of the current document; displaying of a warning for any detected conflicting overlap.

Another exemplary embodiment of the disclosure is directed toward a multifunction printing device for preparation with at least one applied finishing function to a printed document. The device includes a document preparation program further including a WYSIWYG display function for displaying the document or portions of the document in a WYSIWYG format. The document preparation program is configured to display a current document in a document window, display document finishing options to a user, accept user selections of one or more of the document finishing options, and display a representation of the user-selected document finishing options in the document window with displayed pages of the current document.

A further embodiment of the disclosure is directed toward a multifunction output device that stores a document preparation program for processing of documents, which includes displaying a current document in a first document window, displaying document finishing options, accepting user-selections of one or more of the plurality of document finishing options, displaying a representation of the user-selected document finishing options in the first document window in a WYSIWYG format overlaid on displayed pages of the current document, automatically detecting of a conflicting overlap of content of the document and at least one of the plurality of document finishing options, and warning the user if the conflicting overlap is automatically detected.

DETAILED DESCRIPTION

Figure 1:
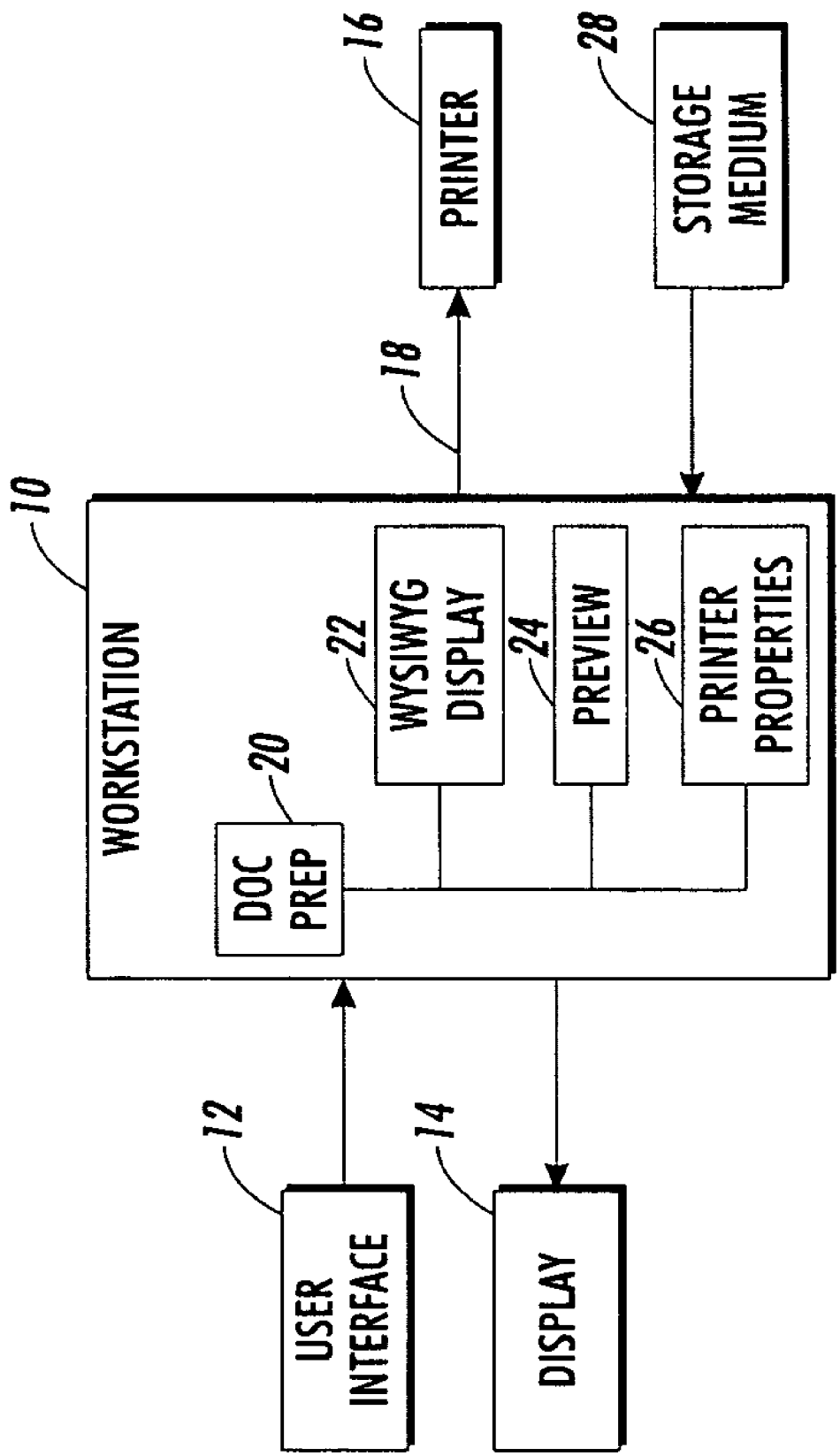
FIG. 1 is a block diagram of a system executing an embodiment of the present application.

With reference to FIG. 1, a workstation 10 where the document is being prepared is shown, the workstation including a user interface 12 for receiving commands and instructions from a user, a display device 14 for displaying instructions and documents to the user, and a printing engine 16. In this disclosure, the workstation is an image processing apparatus also known as a printer/multi-function output device 10 that can be connected to at least one (remote) computer via a connection means. The connection means can be either a local or remote network connection or, alternately, a cable or wireless device connecting the multi-function device 10 to the network computer such as, e.g., a USB cable, a parallel cable, etc. The multi-function output device 10 includes a processor and memory (not shown) suitable for running and/or displaying a document preparation program 20 such as, e.g., a word processing program.

The document preparation program 20 includes a WYSIWYG display function 22 in case the user opts to display the document being prepared in a WYSIWYG format. The document preparation program 20 also includes a preview function 24 allowing the user to preview how printed output will appear when printed on the multi-function output device 10. A printer properties function 26 enables the user to enter various options related to the document being prepared such as, e.g., margin specifications, column specifications, and finishing options related to the document. The multi-function output 10 is shown executing the document preparation program 20 and its included functions locally, however, it is to be understood that this arrangement is for purposes of explaining the present application only. The multi-function output device 10 may alternately be connected to a server computer which executes the document preparation program 20 remotely on the server computer providing the results back to the multi-function output device 10 for display on the display device 14. It is to be further understood that the scope of the present application is not limited to any particular arrangement of a multi-function output device communicates with both computers and peripheral devices.

A part or all of the processing of each function of embodiments described herein can be realized by the program 20 and executed by the multi-function output device 10. In this case, the program 20, data used by the program, and the like, can also be stored in a storage medium 28 that can be read by memory of the multi-function output device. The storage medium is a medium capable of causing change state of energy such as magnetism, light, or electricity in response to the descriptions of the program for a reader provided as the hardware resources and transferring the descriptions of the program to the reader in the format of a signal corresponding to the change state, such as, e.g., a magneto-optical disk, an optical disk such as a CD or DVD, etc., a magnetic disk, or memory such as an IC card, a memory card, etc. Of course, the storage media are not limited to portable media.

The program 20 is previously stored in any of the storage media and the appropriate storage medium can be read by the multi-function output device 10 for executing the functions of the multi-function output device or the multi-function output method of the disclosure. Alternatively, a storage medium may be previously placed or built in a computer and the program 20 may be transferred to the multi-function output device 10 through a network, for example, and may be stored in the storage medium 28 for execution. Of course, some functions can also be implemented as hardware or all may be implemented as hardware.

Figure 6:
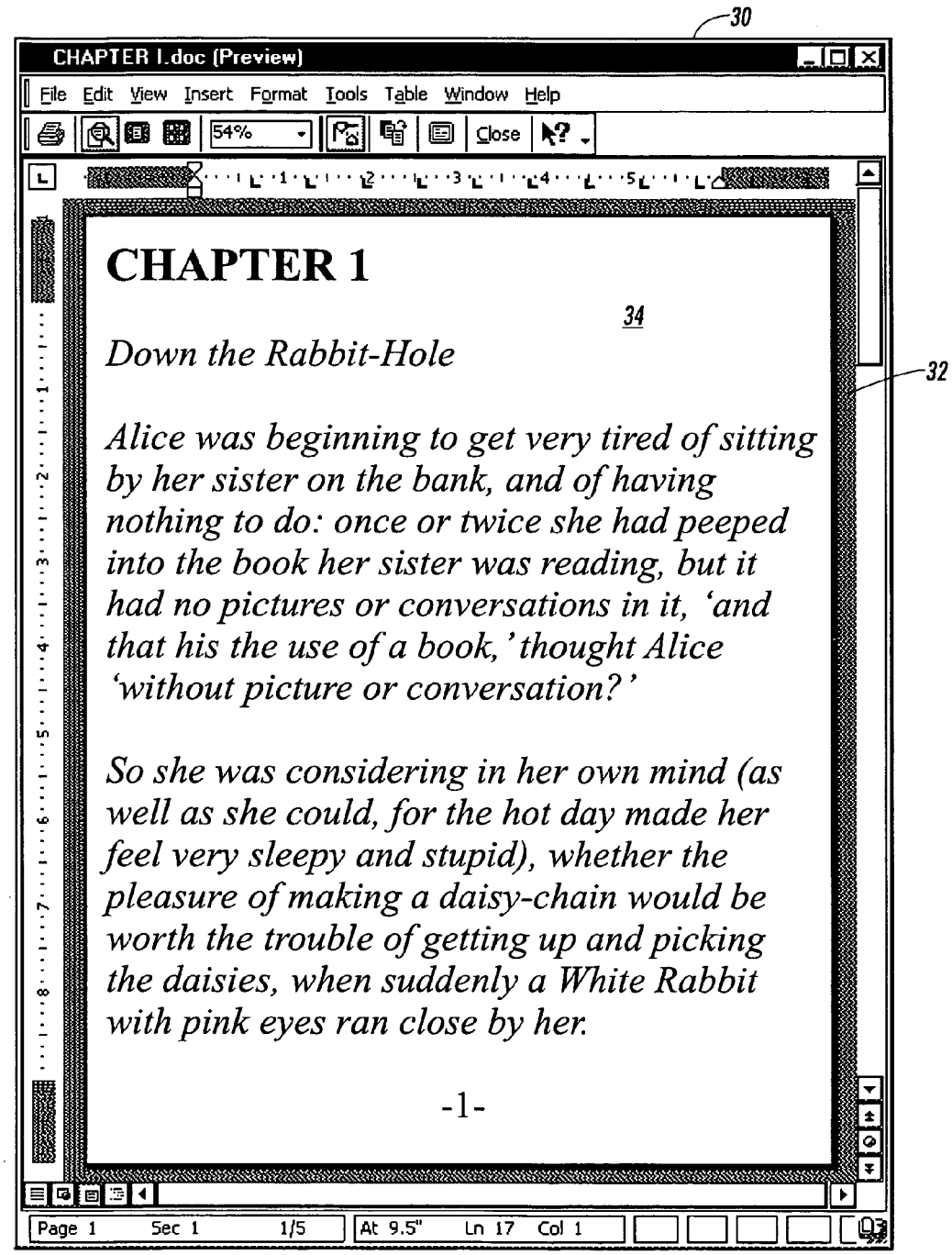
FIG. 6 is a prior art document preparation window.

With reference now to FIG. 6, a document preparation window 30 is shown operating according to methods currently known in the art. The document preparation window 30 includes a document display window 32 in which a current document 34 is being displayed in a WYSIWYG format. It is to be noted that, although the document is to be prepared with various finishing options such as, e.g., punched holes on the left side of the document, that the finishing options are not displayed in the display window 32 even though the user has asked that the document be displayed in a WYSIWYG format. The document preparation window 30 includes a menu bar 36 which gives the user access to various options regarding the document 34 such as, e.g., a printer properties menu for specifying various options such as the aforementioned finishing options and other options such as, e.g., page margins. This leads to confusion for the user as to precisely where the finishing options will be applied to the document with respect to the printed text, and possible ambiguity or conflicts with respect to the selected options such as, e.g., selecting staples in diagonally opposite corners of the document.

Figure 2:
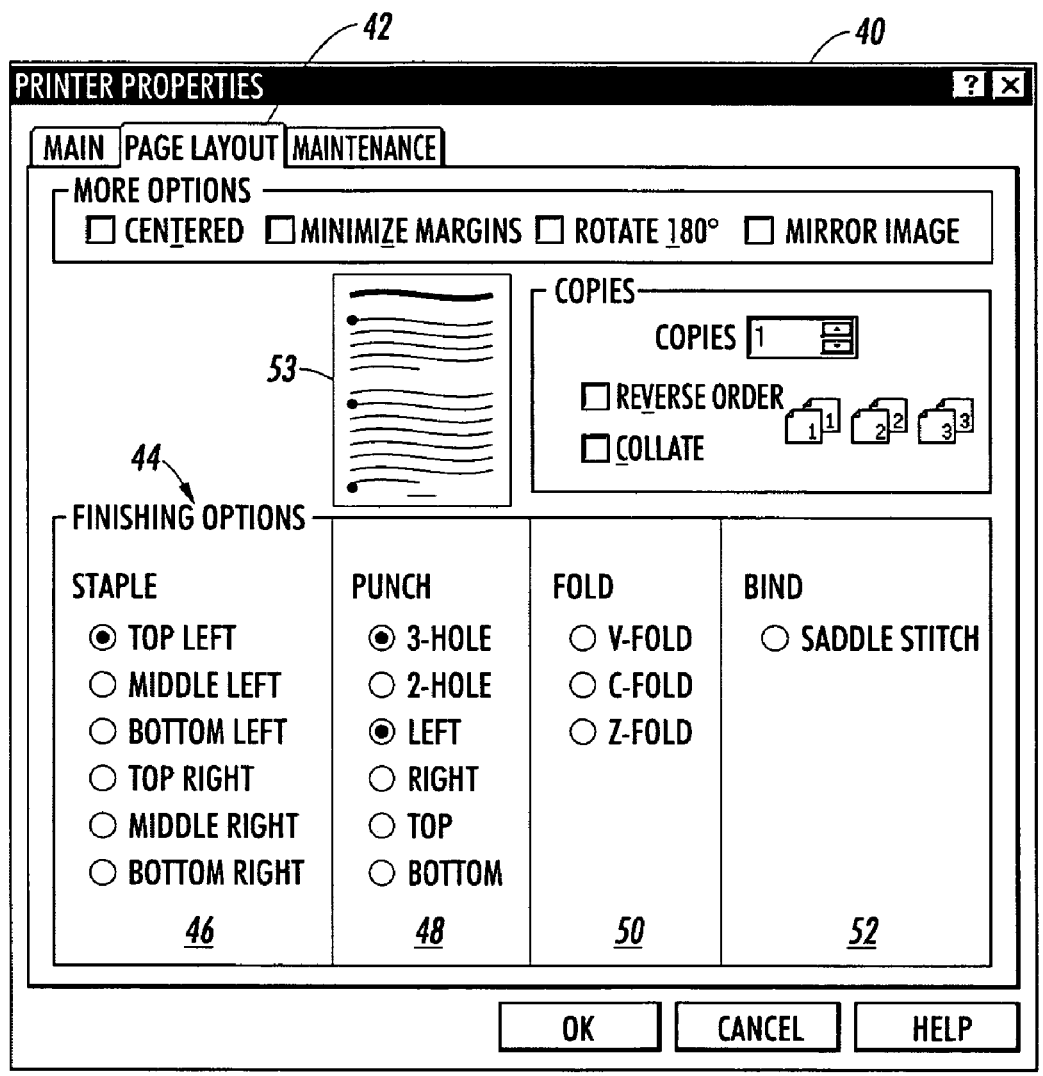
FIG. 2 is a printer properties window of an embodiment of the present application.

With reference now to FIG. 2, a printer properties window 40 as might be displayed by the aforementioned printer properties function 26 in accordance with concepts of the present application, is shown. The printer properties menu 40, under a page layout tab 42, includes a finishing options sub-window 44 for choosing various stapling, hole punching, folding, and binding options. The finishing options sub-window 44 further includes a stapling option menu 46, a hole-punching options menu 48, a folding options menu 50, and a binding options menu 52. As shown in the figure, the user at the multi-function printer device 10 has chosen to staple the document in the top left corner, with the document to have 3-hole punching on the left side. It is to be appreciated that the arrangement of the finishing options in the printer properties window 40 is exemplary only, and other arrangements and presentations of the finishing options are included within the scope of the present application. In some embodiments, a properties preview window 53 may be included in the printer properties menu 40 to provide immediate graphical feedback and graphical confirmation of the user's choice of finishing options 44. In some embodiments, the document preparation program 20 will block or prevent conflicting options such as the previously mentioned choice of staples on diagonally opposite corners of the document.

Figure 3:
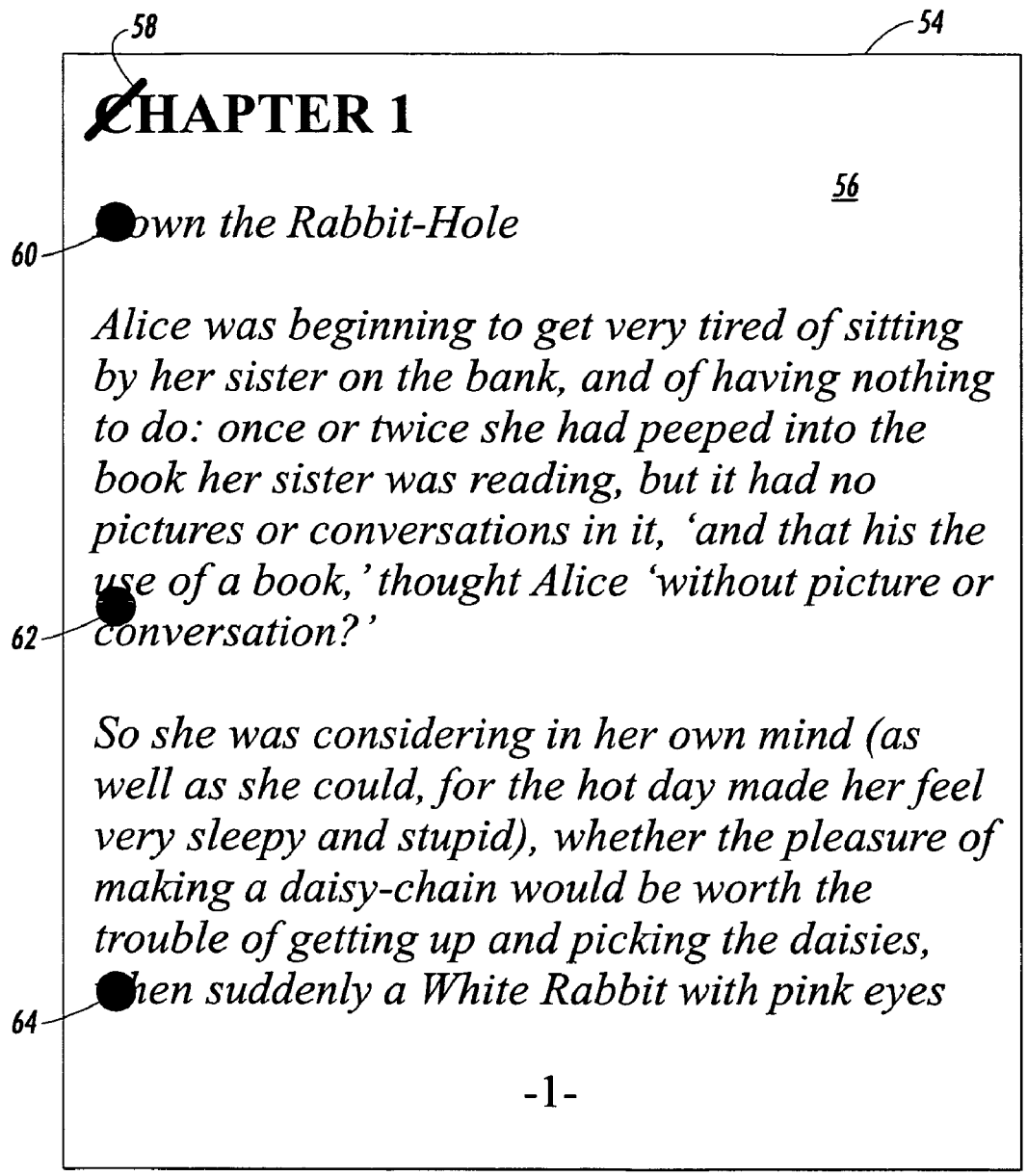
FIG. 3 is a document window showing a document having a conflict with finishing options.

With reference now to FIG. 3, a document window 54 is shown wherein a document 56 is being displayed in a WYSIWYG format by the document preparation program 20. It is to be appreciated that, although the concepts of the present application are described with reference to a WYSIWYG presentation of the document 56, alternately, methods of the present application apply equally well to documents displayed in print preview windows and other methods of displaying the document in a WYSIWYG or semi-WYSIWYG format. Concepts of the present application may also be applied to presentations of the document 56 in a non-WYSIWYG format with representations of the finishing options being shown, however, in the document window 54.

The aforementioned finishing options described with reference to FIG. 2 can be observed in the document window 54 in the figure. For example, a graphical representation of a staple 58 is shown in the top left corner of the document, and three representations of holes 60-64 are shown on the left side of the document corresponding to the user's choice of finishing options. An advantage of methods of the present application is readily apparent in the figure. The user has apparently chosen a left side margin which conflicts with the choice of finishing options that is made apparent because the graphical representations of the staple 58 and holes 60-64 overlap the textual portion of the document 56. It is of significance that this can be easily recognized as the document is being prepared or edited, rather than at the time of printing, thereby providing savings with respect to time, cost and effort.

Figure 4:
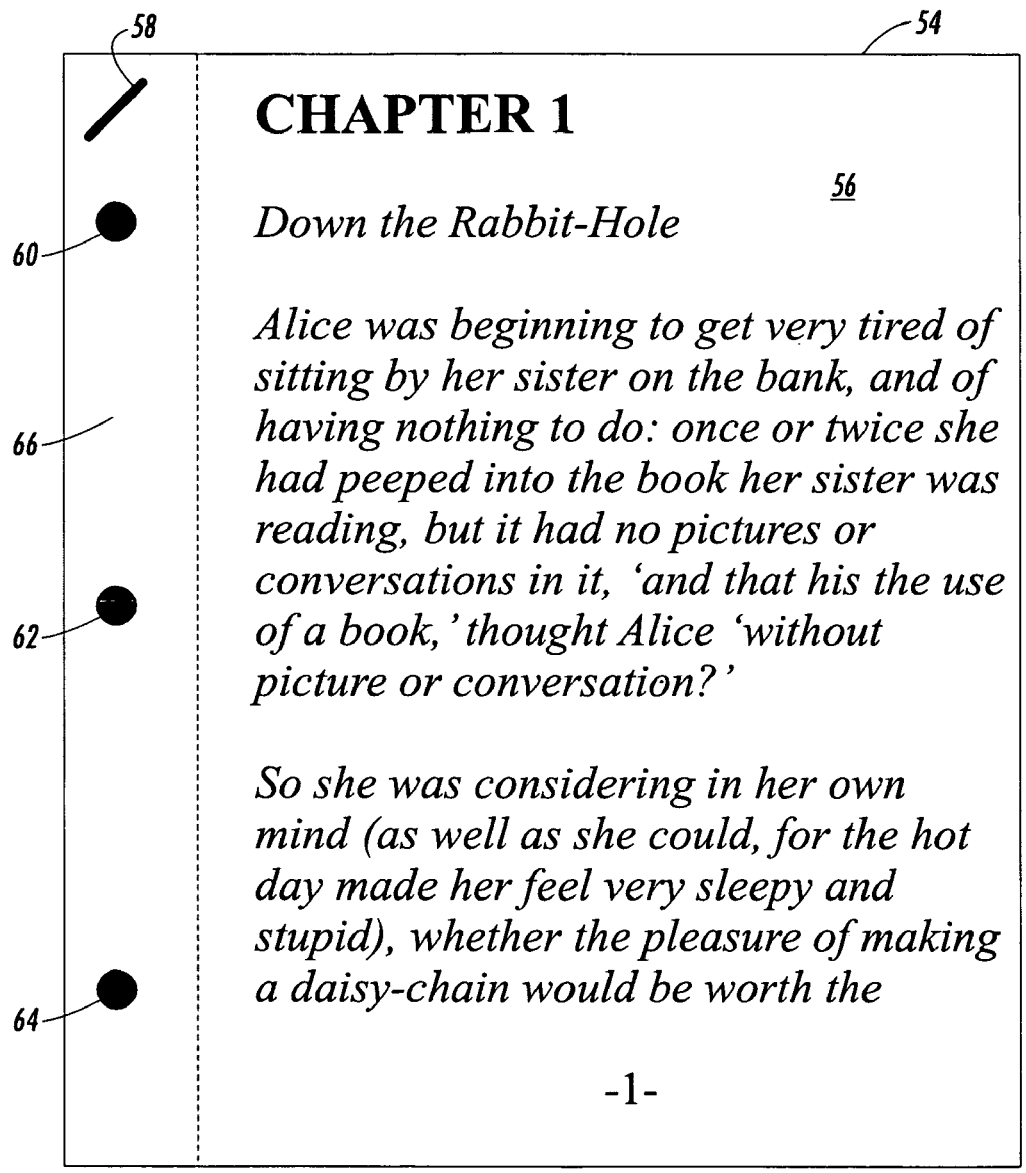
FIG. 4 is a document window showing a document after correcting a conflict with finishing options.

The user can readily adjust the margin settings to correct the problem made apparent in FIG. 3. Features of document preparation programs for adjusting margin settings of a document are commonplace and well known in the art and are, therefore, not described in detail. With reference now to FIG. 4, the user has increased the left side margin size, and the staple 58 and holes 60-64 now fall within an enlarged margin 66 without any overlap of the textural area of the document 56. Thus, both conflicts of finishing options and the lack of conflicts are made readily apparent to the user. Further, it is an advantage of the present application that, should a conflict arise between the user-selected finishing options and the prepared text during subsequent preparation of the document, the conflict will become readily apparent to the user upon viewing the WYSIWYG representation of the finishing options overlaid on the document 56 in the document window 54.

Figure 5:
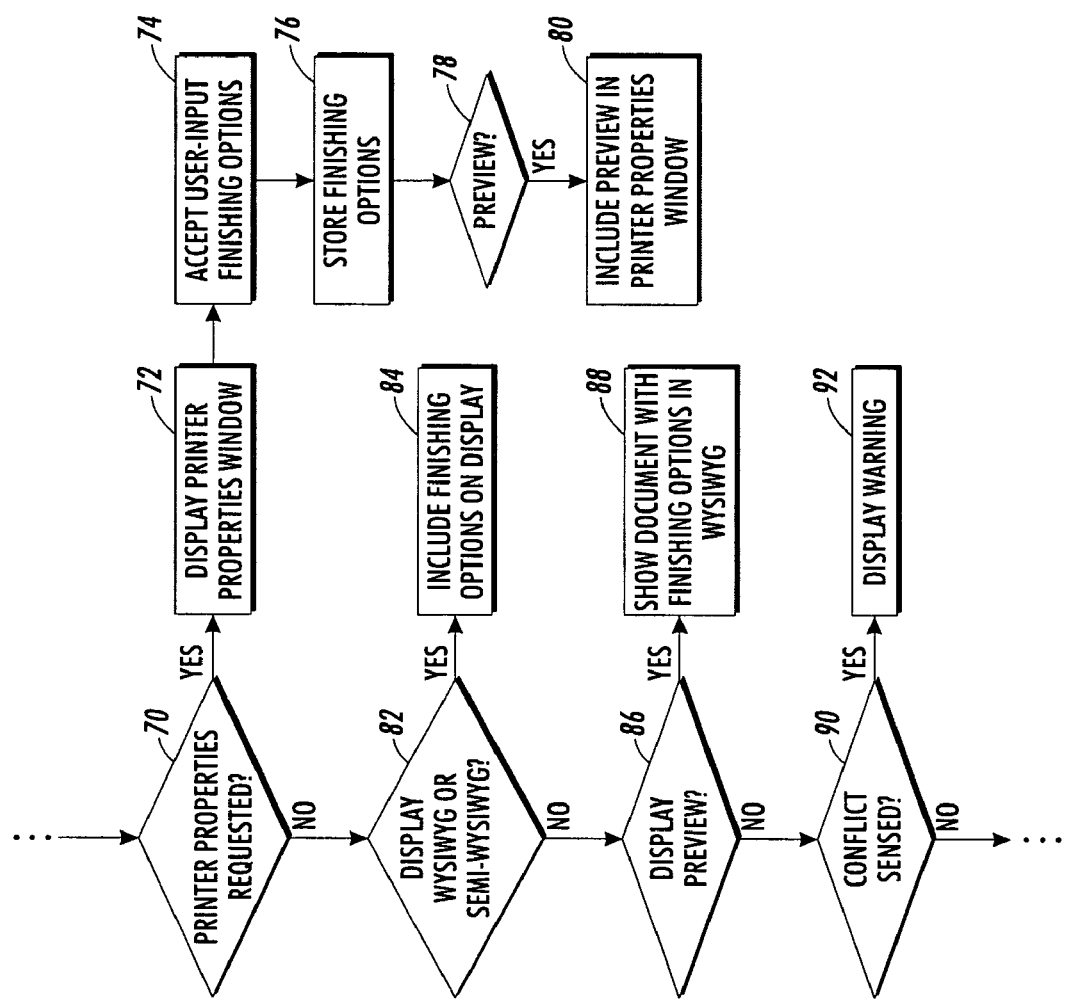
FIG. 5 is flowchart showing methods of the present application.

With reference now to FIG. 5, methods of the present application are shown in the form of a flow chart to aid in a further understanding of the application. The flow chart is an exemplary arrangement only and is not intended to narrowly define methods of the present application but, rather, only to show a general operation of the methods. For example, during operation of the document preparation program 20, the user, at some point in time, may request a printer properties menu at step 70. In response, the program displays a printer properties menu at step 72 and accepts user-specified finishing options at step 74. The finishing options are stored for further use at step 76. In some embodiments, it may be desirable to offer a document preview in the printer properties menu to aid the user in selecting an appropriate set of finishing options. If, at step 78, it is determined that a preview window is to be shown, a preview of a current page or other page is shown in the printer properties menu at step 80.

During normal processing of the document 56, in a typical document preparation program 20, the user has a choice of various display formats for the document. The user may choose a display format wherein only the text is displayed and no other information or formatting regarding the document is shown, sometimes referred to as a normal view. However, if the user chooses a WYSIWYG format, sometimes referred to as a print layout view, or a semi-WYSIWYG format, or chooses to include a representation of the finishing options in any other form of display format, as determined at step 82, the currently stored finishing options are shown in the document display window 54 at step 84. Supplementally, or alternately, if the user requests a print preview function at step 86, pages of the currently prepared document can be displayed in a WYSIWYG format at step 88 including graphical representations of the stored finishing options.

In some embodiments, particularly in situations where the document is not being displayed in a WYSIWYG format, it may be desirable for the document preparation program 20 to perform an auto conflict-sensing function to automatically determine if there is a conflict between the finishing options and text, images and/or other content within the document being prepared. Because the document preparation program 20 can readily detect any overlap of the selected finishing options with text on any particular page, the program can determine at step 90 if any conflict exists. If a conflict exists, a warning may be displayed to the user in any of a number of methods known in the art. For example, a blinking icon may represent a potential finishing option conflict with the document, or a pop-up window may be presented warning the user of the problem.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of configuring document finishing options on a network computer, comprising:
   displaying a document display window in a document preparation window;
   displaying a WYSIWYG document in the document display window including at least content of the document while simultaneously displaying in the document preparation window a menu bar including at least a page layout tab;
   including a selection of finishing options under the page layout tab;
   applying selected finishing options to the document using the page layout tab, wherein the selected finishing options are applies to and saved for application to the document as the document is being prepared rather than at a time of printing;
   selecting a print preview display option included under the page layout tab;
   immediately graphically representing the selected finishing options in a WYSIWYG representation overlaid on content of the document in a print preview window
   detecting a conflict viewable as an overlap in the graphical representation, wherein the conflict is detected as the document is being prepared and edited rather than at the time of printing;
   receiving user margin settings of the content to correct any overlap of the content and the selected finishing options;
   displaying in the document display window the modified document; and, continuing any preparing and editing of the document.

2. The method of claim 1, wherein the finishing options include at least one of stapling options, hole punching options, folding options, and binding options.

3. The method of claim 1, further including:
   displaying the finishing options in a printer properties menu window under the page layout tab.

4. The method of claim 3, further including:
   displaying an option for the print preview display in the printer properties menu window.

5. The method of claim 3, further comprising:
   preventing the user from entering conflicting finishing options.

6. A multifunction printing device fort preparation of printed documents with at least one applied finishing function to a printed document, the device comprising:
   a processor and memory; and,
   a document preparation program including:
   a WYSIWYG display function for displaying the document or portions of the document in a WYSIWYG format on a display of the multifunction printing device;
   the document preparation program configured to:
      display format options for at least a normal view and a print layout view;
      display a document display window in a document preparation window; includes at least content of a current document in a WYSIWYG format in the document display window if the print layout view is selected while simultaneously displaying a plurality of document finishing options to a user;
      accept user-selections of one or more of the plurality of document finishing options as the document is being prepared rather than at a time of printing; and
      immediately display a representation of the user-selected document finishing options in the document preparation window in the WYSIWYG format with displayed pages of the current document, and,
      detect a conflict viewable as an overlap in the WYSIWYG format, wherein the conflict is detected as the document is being prepared and edited rather than at the time of printing.

7. The multifunction printing device of claim 6, further comprising:
   a preview function configured to:
      display the current document in a printer preview window; and
      display a WYSIWYG representation of the user-selected document finishing options in the printer preview window overlaid on the current document.

8. The multifunction printing device of claim 6, further comprising:
   a printer properties function configured to:
      display a printer properties menu window including selection options for each of the plurality of document finishing options.

9. The multifunction printing device of claim 8, wherein the printer properties function is further configured to:
   display a printer properties preview window in the printer properties menu window; and display a WYSIWYG representation of the user-selected document finishing options in the printer properties preview window overlaid on a page of the current document.

10. The multifunction printing device of claim 8, wherein the printer properties function is further configured to:
prevent the user from entering conflicting finishing options.

11. A multifunction output device comprising a non-transitory computer readable storage medium that stores a document preparation program for processing of documents, the processing comprising:
displaying a document display window in a document preparation window; displaying a WYSIWYG document in the document display window including at least content of the document while simultaneously displaying in the document preparation window a menu bar including at least a page layout tab;
including a selection of finishing options under the page layout tab;
applying selected finishing options to the document using the page layout tab;
detecting a conflicting overlap between the selected finishing options and the content of the document, wherein the conflict is detected as the document is being prepared and edited rather than at a time of printing;
indicating the overlap to a user;
selecting a print preview display option included under the page layout tab;
immediately graphically representing the selected finishing options in a WYSIWYG format including the content of the document in a print preview window; receiving user margin settings of the content to correct the overlap;
displaying in the document display window the modified document; and,
continuing preparation of editing on the document.

12. The multifunction output device of claim 11, wherein the detecting of the conflicting overlap of the processing further includes preventing the user from entering conflicting finishing options.

13. The multifunction output device of claim 11, wherein the processing further comprises:
displaying the finishing options in a printer properties menu window under the page layout tab; and,
displaying an option for the print preview display in the printer properties menu window.

14. The multifunction device of claim 6, wherein the document preparation program is further configured to automatically detect a conflicting overlap of the user-selected document finishing options with document content and warn the user if the conflicting overlap is automatically detected.

* * * * *